(12) United States Patent
Mangrum

(10) Patent No.: US 6,732,892 B1
(45) Date of Patent: May 11, 2004

(54) HITCH CARRYING RACK FOR ALL TERRAIN VEHICLES

(76) Inventor: Keith Mangrum, 7244 Bahne Rd., Fairview, TN (US) 37062

( * ) Notice: Subject to any disclaimer, the term of this patent is extended or adjusted under 35 U.S.C. 154(b) by 124 days.

(21) Appl. No.: 10/192,574

(22) Filed: Jul. 10, 2002

(51) Int. Cl.[7] .................................................. B60R 9/00
(52) U.S. Cl. ..................... 224/401; 224/453; 224/494; 224/502; 224/505; 224/564; 224/42.32
(58) Field of Search ................... 224/401, 402, 224/405, 408, 410, 412, 419, 423, 425, 426, 445, 446, 452, 453, 513, 519–521, 494, 502, 505, 564, 42.32, 42.34, 274; 414/462

(56) References Cited

U.S. PATENT DOCUMENTS

| | | | |
|---|---|---|---|
| 5,527,146 A | 6/1996 | Allsop et al. | |
| 5,544,799 A | 8/1996 | Didlake | |
| 5,560,666 A | 10/1996 | Vieira et al. | |
| 5,707,072 A | 1/1998 | Hopper | |
| 5,746,275 A | * 5/1998 | Cross et al. | 280/503 |
| 5,806,737 A | 9/1998 | Clark | |
| 5,845,832 A | 12/1998 | Eichmann | |
| 5,850,959 A | 12/1998 | Miller | |
| 5,884,824 A | 3/1999 | Spring, Jr. | |
| 6,145,720 A | 11/2000 | Comeau | |
| 6,237,823 B1 | 5/2001 | Stewart et al. | |
| 6,254,117 B1 | * 7/2001 | Cross | 280/401 |
| 6,286,854 B1 | * 9/2001 | Cross | 280/504 |
| 6,312,210 B1 | * 11/2001 | Lang | 414/462 |
| 6,378,748 B1 | * 4/2002 | Cox | 224/401 |
| 6,461,095 B1 | * 10/2002 | Puska | 224/401 |
| 6,638,001 B1 | * 10/2003 | McKinley | 224/401 |

* cited by examiner

*Primary Examiner*—Nathan J. Newhouse
(74) *Attorney, Agent, or Firm*—Waddey & Patterson; Emily A. Shouse; David B. Pieper

(57) ABSTRACT

An extension bed apparatus for carrying a load with a vehicle. The extension bed includes a frame connector adapted to connect to the vehicle frame, a bed wall extending upward from the frame connector, a bed base adapted to be compacted or extending for carrying different loads, and a first movement absorbing connector attaching the bed wall to the frame rack so that the shock absorbing system on the vehicle may move the frame rack mounted on the vehicle body in relation to the frame while still supporting the extension bed. Multiple racks may be used for supporting loads off of both the front and back of the vehicle.

21 Claims, 14 Drawing Sheets

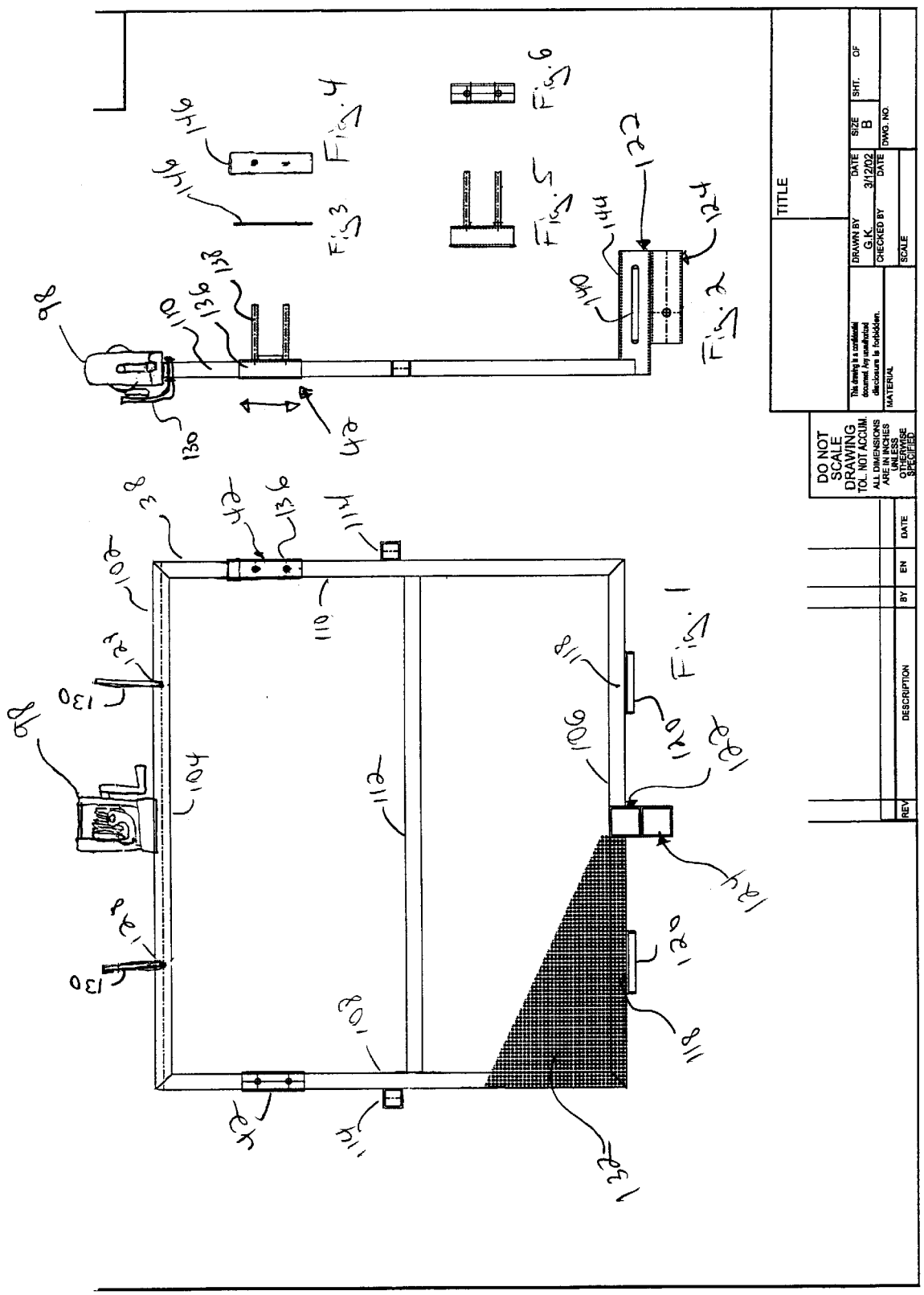

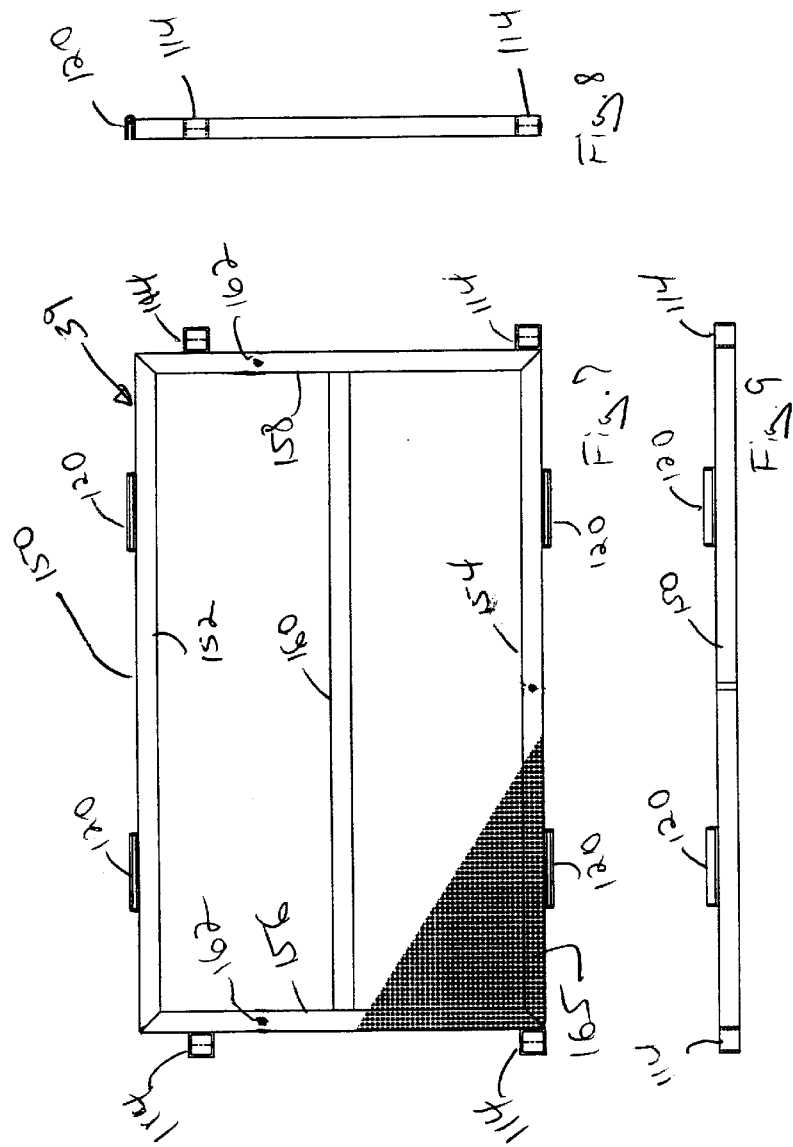

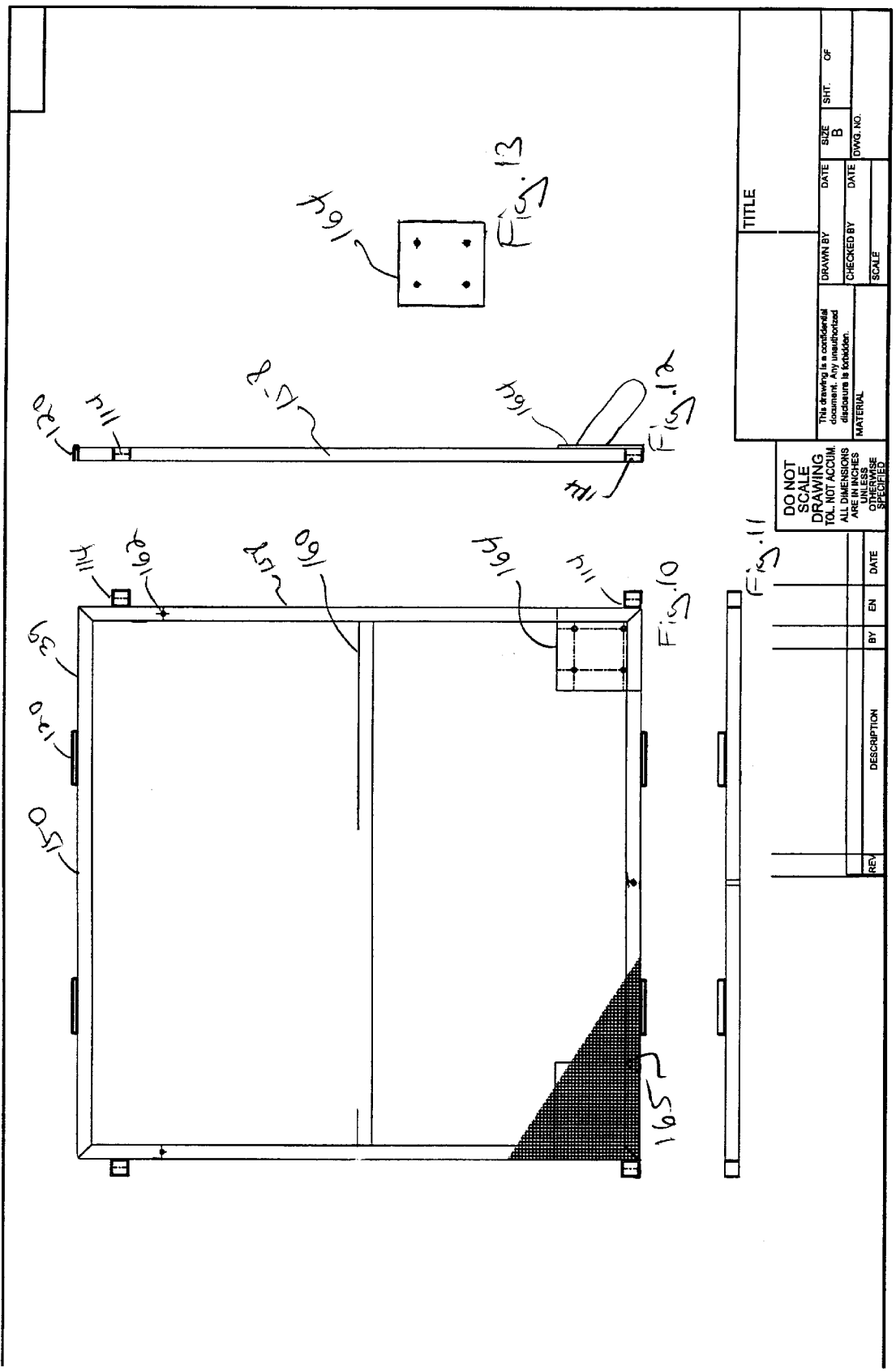

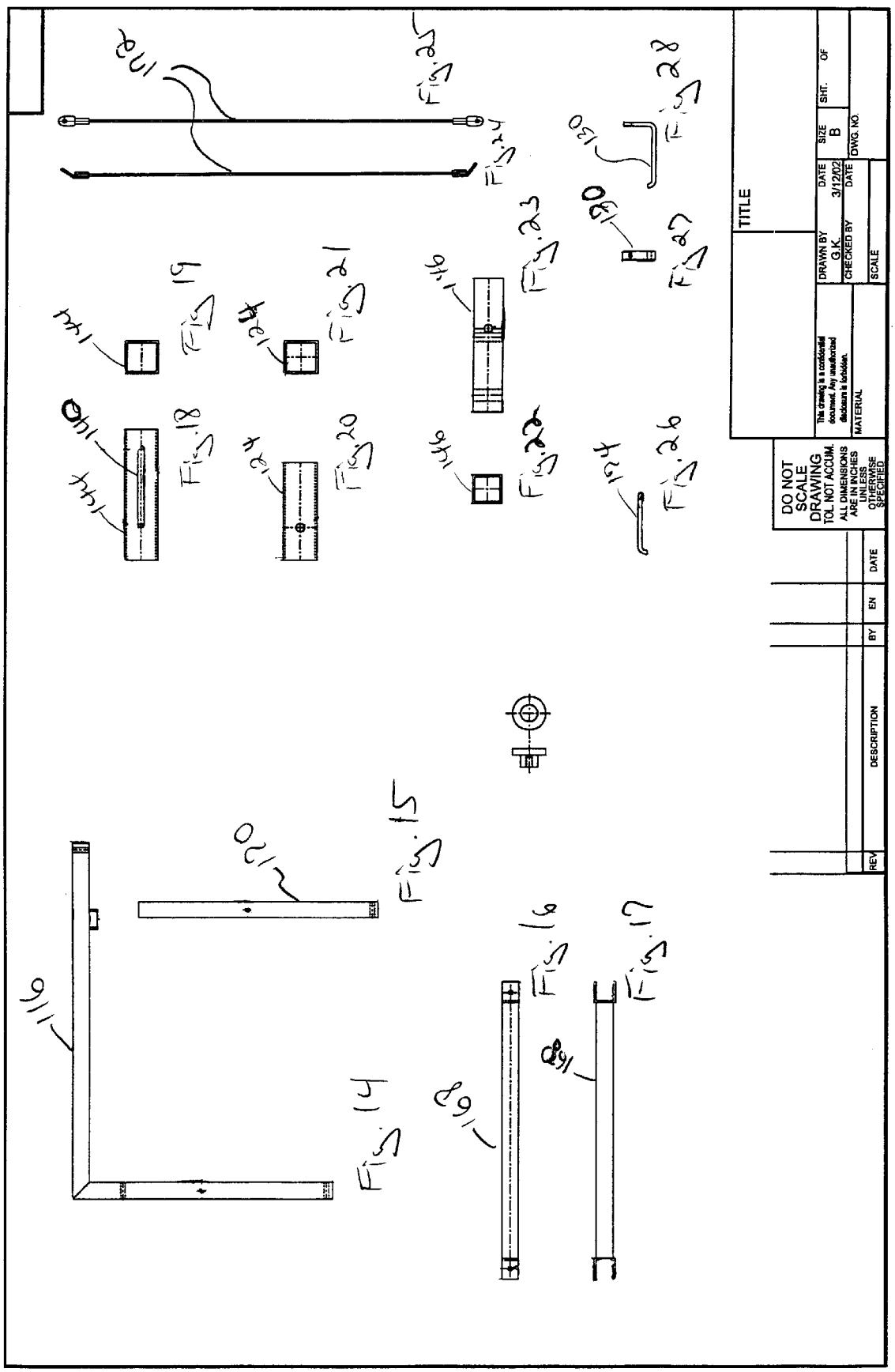

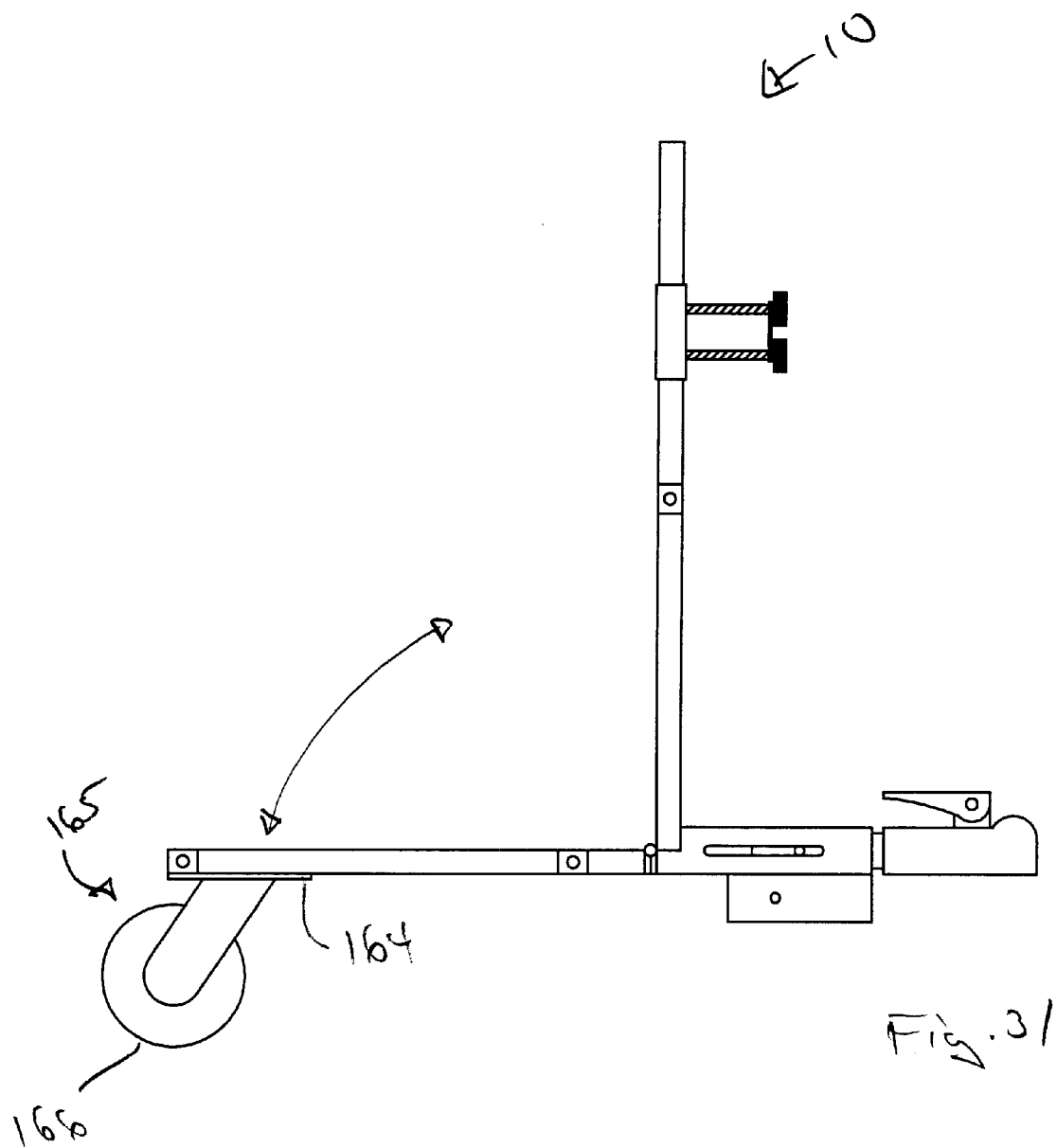

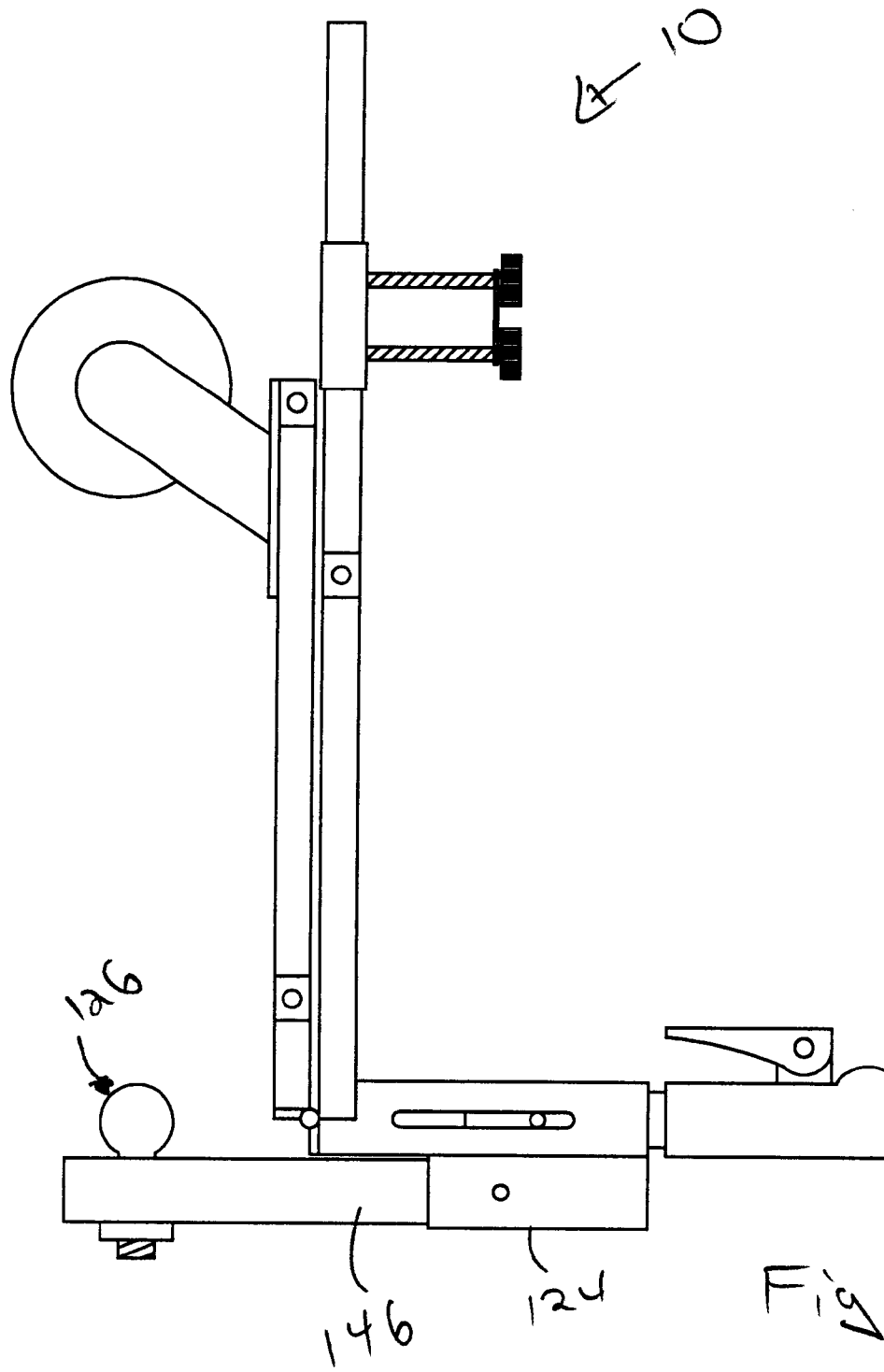

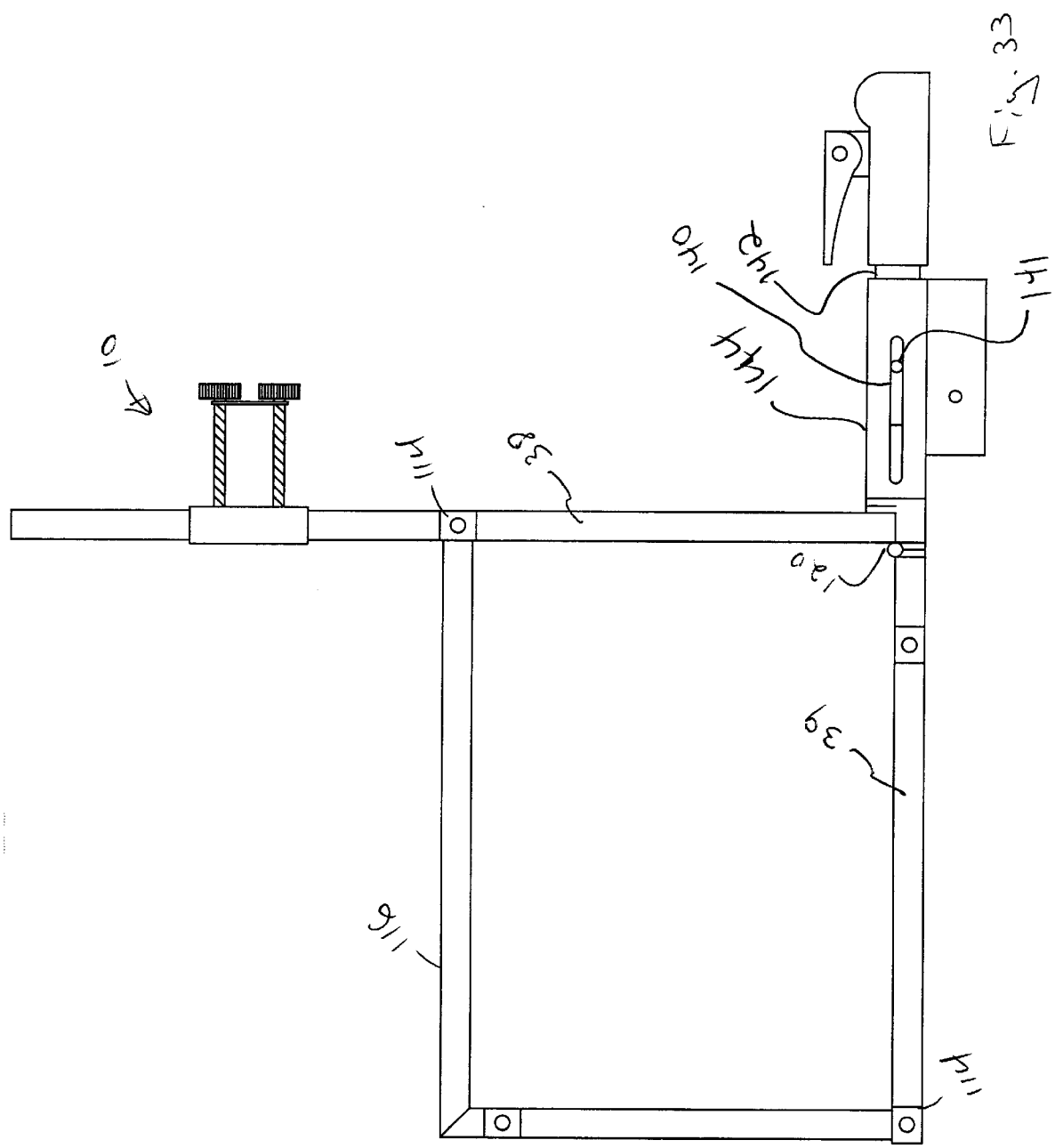

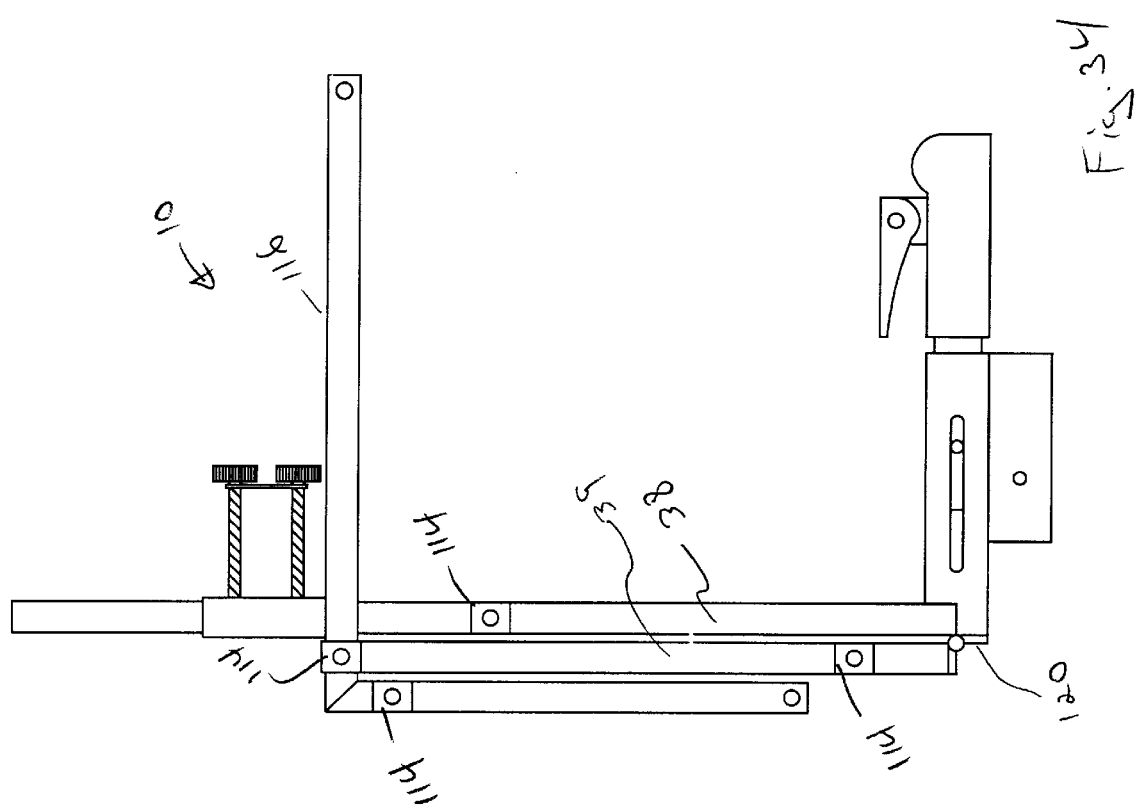

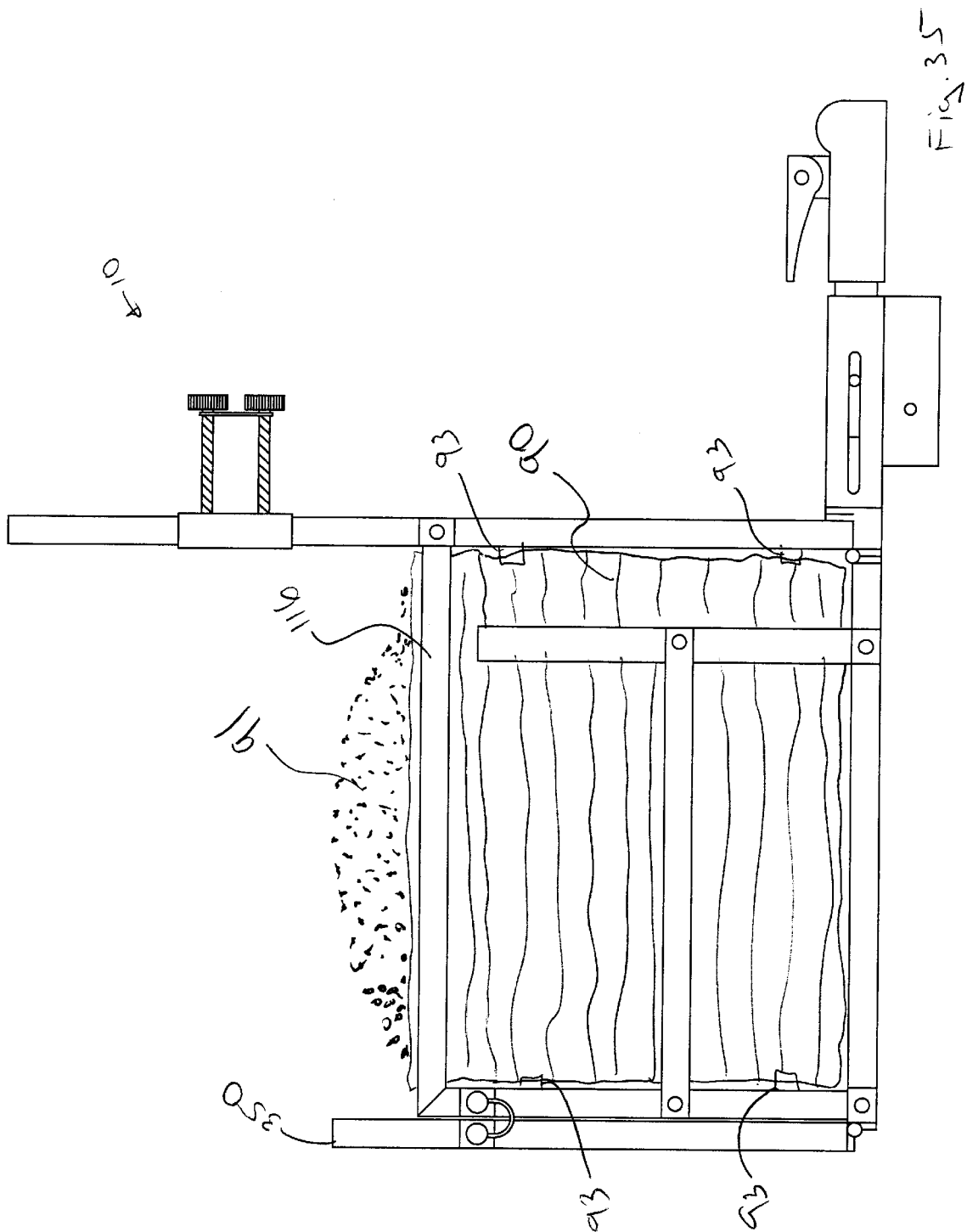

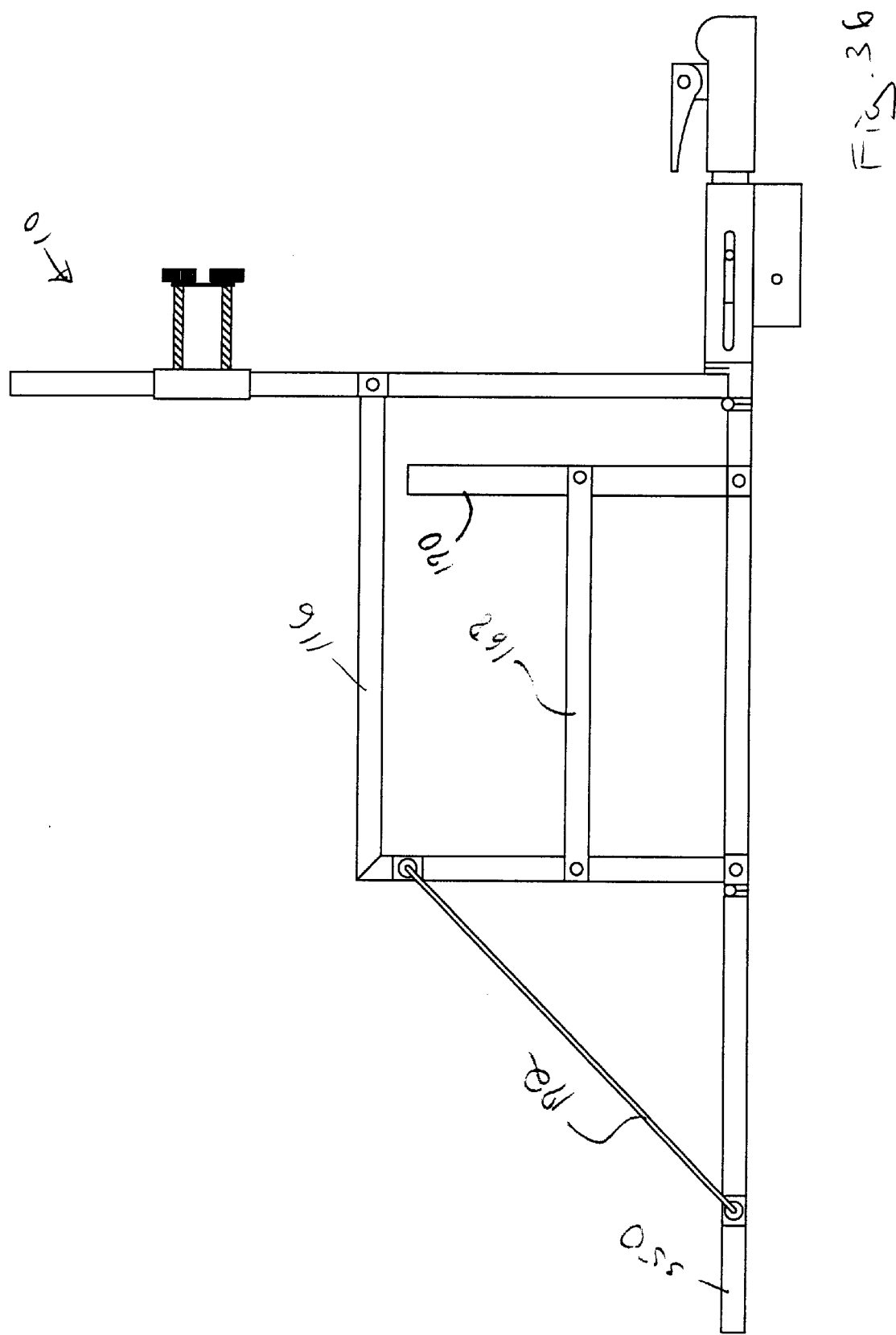

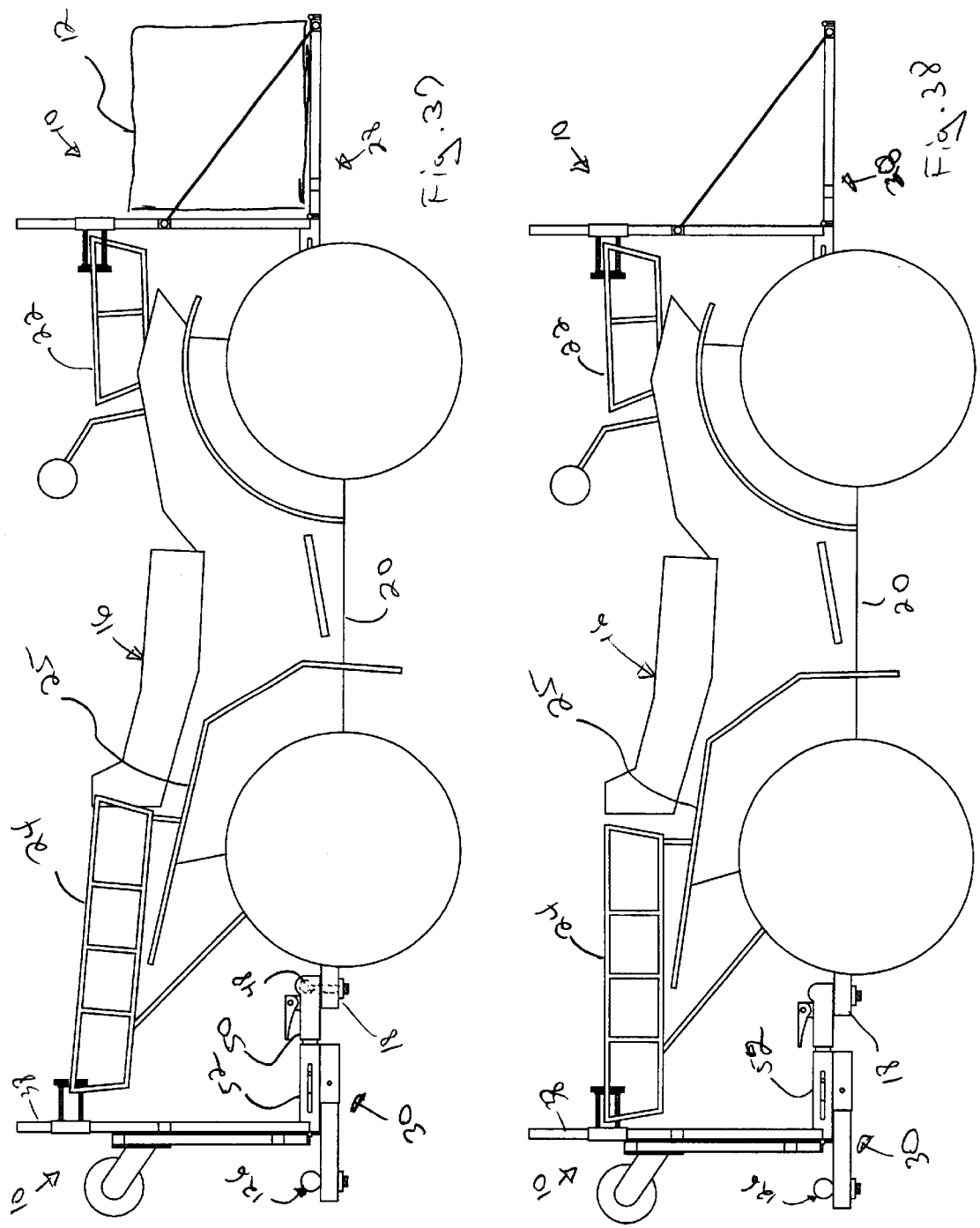

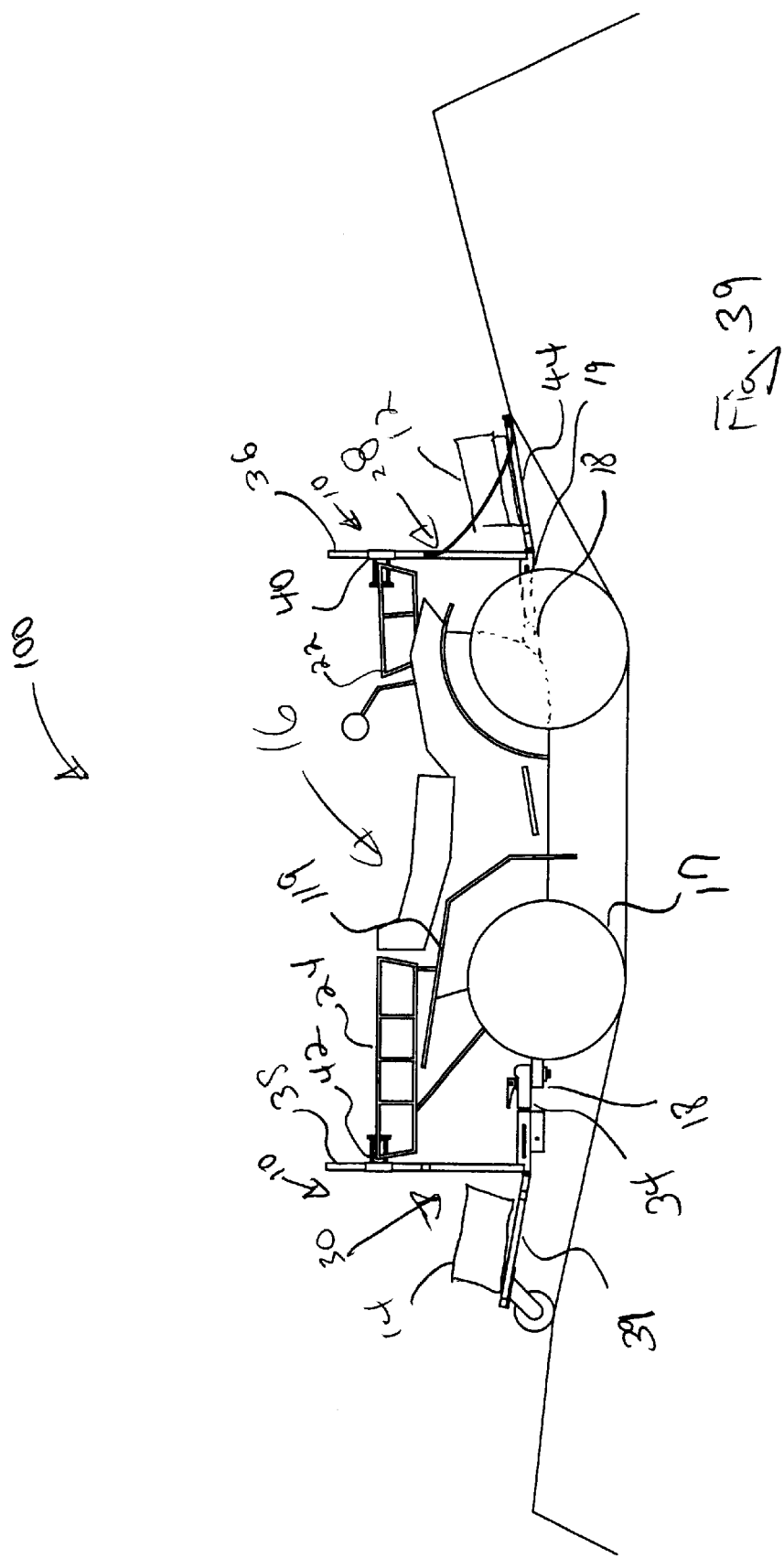

HITCH CARRYING RACK FOR ALL TERRAIN VEHICLES

BACKGROUND OF THE INVENTION

The present invention relates generally to cargo racks and more particularly, this invention pertains to an extended cargo rack for increasing the load carrying capability of an all terrain vehicle.

Several United States Patents disclose cargo systems or involve receiver hitch connections. These include: U.S. Pat. No. 5,527,146 issued to Allsop, et al. on Jun. 18, 1996 entitled Vehicle-Mounted Articulated Support Rack; U.S. Pat. No. 5,544,799 issued to Didlake on Aug. 13, 1996 entitled Swing Away Cargo Carrier Assembly; U.S. Pat. No. 5,560,666 issued to Vieira, et al. on Oct. 1, 1996 entitled Removable Rack System; U.S. Pat. No. 5,707,072 issued to Hopper on Jan. 13, 1998 entitled Receiver Hitch System For All-Terrain Sport Vehicles; U.S. Pat. No. 5,806,737 issued to Clark on Sep. 15, 1998 entitled Cargo Carrier For Motor Vehicles; U.S. Pat. No. 5,845,832 issued to Eichmann on Dec. 8, 1998 entitled Rear-Mounted Vehicle Cargo Carrier; U.S. Pat. No. 5,850,959 issued to Miller on Dec. 22, 1998 entitled Multifarious, Vehicle Cargo Carrier System; U.S. Pat. No. 5,884,824 issued to Spring, Jr. on Mar. 23, 1999 entitled Equipment Transport Rack for Vehicles Providing Improved Loading Accessibility; U.S. Pat. No. 6,145,720 issued to Comeau on Nov. 14, 2000 entitled Vehicle Cargo Carrier; and U.S. Pat. No. 6,237,823 B1 issued to Steward, et al. on May 29, 2001 entitled Hitch Supported Carrier For A Vehicle. Each of these patents is hereby incorporated by reference.

These patents fail to disclose the advantages of the present invention in providing a three point connection or four point connection with sliding connectors to allow for the use of the cargo rack on a small shock absorbing all terrain vehicle. What is needed, then, is a hitch carrying rack for all terrain vehicles.

SUMMARY OF THE INVENTION

In accordance with the present invention, an improved hitch carrying rack apparatus for all terrain vehicles is provided as well as the method of using the apparatus which addresses the drawbacks of the prior art devices. In one of its exemplary forms, the extension bed apparatus is adapted for carrying a load with a vehicle where the vehicle includes an attachment block connected to a frame and a frame rack connected to the frame through a moveable shock absorbing connection. The extension bed apparatus includes a frame connector adapted to connect to the attachment block, a bed wall connected to and extending upward from the frame connector, a first movement absorbing connector attaching the bed wall to the frame rack, the movement absorbing connector adapted to allow movement of the frame rack relative to the attachment block, and a bed base connected to the bed wall and adapted to extend laterally away from the vehicle to support the load.

An additional use of the extension beds is taught by an apparatus and method for an extension bed carrying system that may be utilized for carrying multiple loads off of both a front and back load off of a vehicle. The vehicle includes a frame with both a rear frame rack and a front frame rack that are connected to the frame through one or more moveable shock absorbing connections. The frame also includes both a front connecting block and a back connecting block. The system then includes a front extension bed and a back extension bed. The front extension bed includes a front frame connector adapted to connect to the front connecting block and a front bed wall connected to and extending upward from the front frame connector. The front extension bed also includes a first front movement absorbing connector attaching the front bed wall to the front frame rack where the front movement absorbing connector is adapted to allow movement of the front frame rack relative to the front connecting block. And finally, the front extension bed includes a front bed base that is connected to the front bed wall and adapted to extend laterally away from the vehicle to support the first load. The basics of this extension bed are then mirrored for the rear of the vehicle. This allows the front bed to support the front load and the back bed to support an additional load to balance the loads on the vehicle. Thus, the principal object of the present invention is to provide for additional carrying capacity for an all terrain vehicle.

Other objects and further scope of the applicability of the present invention will become apparent from the detailed description to follow, taken in conjunction with the accompanying drawing wherein like parts are designated by like reference numerals.

BRIEF DESCRIPTION OF THE DRAWINGS

FIG. 1 is a front view of the bed wall showing the movement absorbing connector.

FIG. 2 is a side view of the bed wall showing the movement absorbing connector.

FIG. 3 is a side view of the connector plate.

FIG. 4 is a front view of the connector plate.

FIG. 5 is a side view of the connector base.

FIG. 6 is a front view of the connector base.

FIG. 7 is a top view of the bed base.

FIG. 8 is a side view of the bed base.

FIG. 9 is an end view of the bed base.

FIG. 10 is a top view of an alternative embodiment of the bed base.

FIG. 11 is an end view of an alternative embodiment of the bed base.

FIG. 12 is a side view of the an alternative embodiment of the bed base.

FIG. 13 is a top view of the wheel flange.

FIG. 14 is a side view of the side rail.

FIG. 15 is an end view of the side rail.

FIG. 16 is a side view of the lateral support.

FIG. 17 is a top view of the lateral support.

FIG. 18 is a side view of the insert block for the adjustable truing connector.

FIG. 19 is an end view of the insert block of the adjustable truing connector.

FIG. 20 is a side view of the outer tube for the adjustable truing connector.

FIG. 21 is an end view of the outer tube for the adjustable truing connector.

FIG. 22 is an end view of the trailer hitch extension.

FIG. 23 is a side view of the trailer hitch extension.

FIG. 24 is a side view of the side support cable.

FIG. 25 is a top view of the side support cable.

FIG. 26 is a side view of the connecting pin.

FIG. 27 is an end view of the hanger.

FIG. 28 is a side view of the hanger.

FIG. 31 is a side view of the extension bed apparatus utilizing a wheel in an extended position.

FIG. 32 is a side view of the extension bed apparatus in a compacted position showing the trailer hitch extension.

FIG. 33 is a side view of the extension bed apparatus showing the side support structure.

FIG. 34 is a side view of the extension bed apparatus showing the side support structure in a compacted position.

FIG. 35 is a side view showing the extension bed apparatus with a tailgate and a side support structure with a longitudinal support.

FIG. 36 is a side view of the extension bed apparatus showing the tailgate in an extended position.

FIG. 37 is a side view of an all-terrain vehicle showing the mounting of an extension bed carrying system apparatus.

FIG. 38 is a side view of an all-terrain vehicle showing the extension bed apparatus with flexing of the movement absorbing connectors.

FIG. 39 is a side view of an all-terrain vehicle showing the advantages of utilizing hinges on the extension bed apparatus to allow for veering terrains.

DESCRIPTION OF THE PREFERRED EMBODIMENTS

Figure 29:
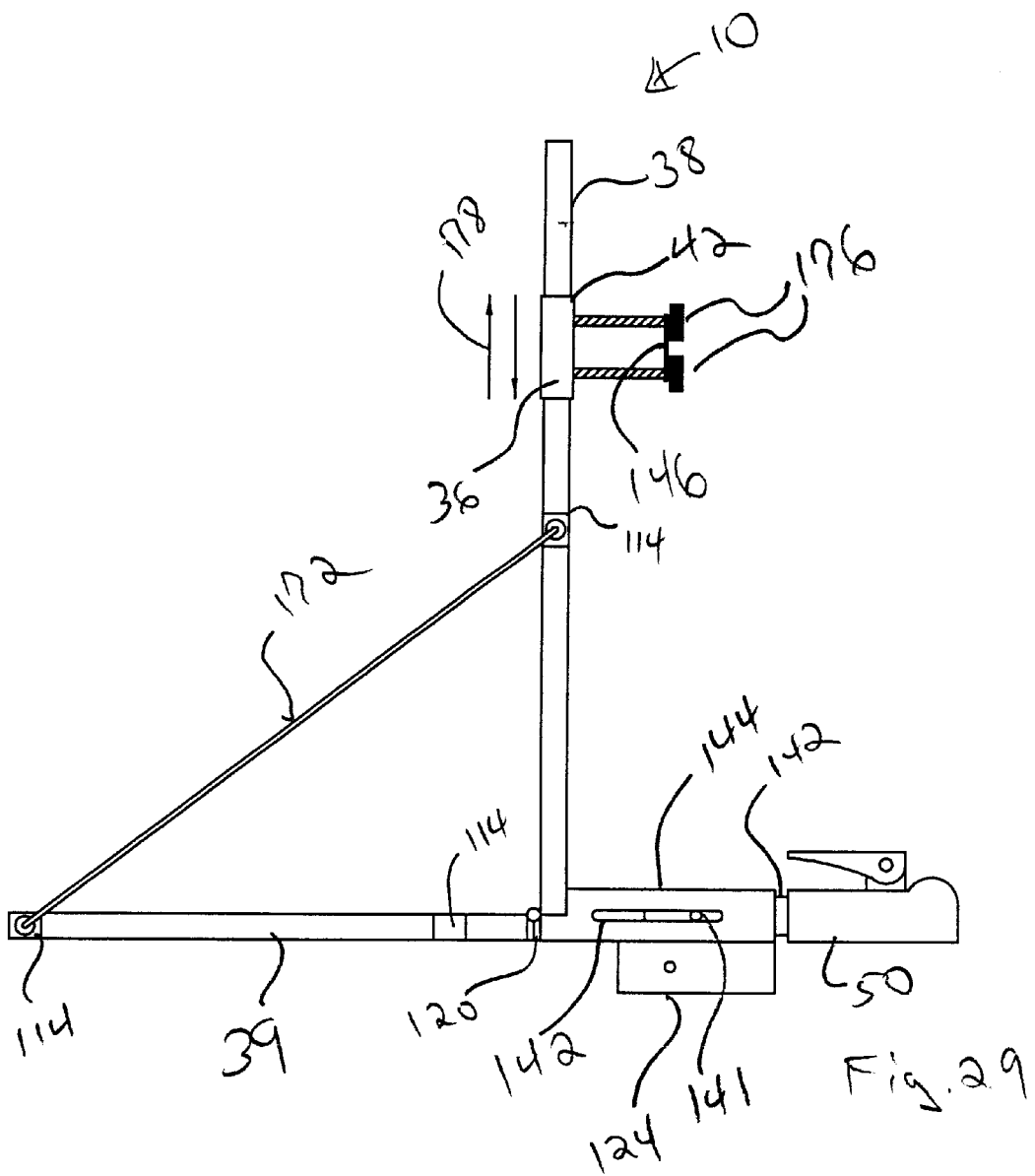
FIG. 29 is a side view of the extension bed apparatus.
Figure 30:
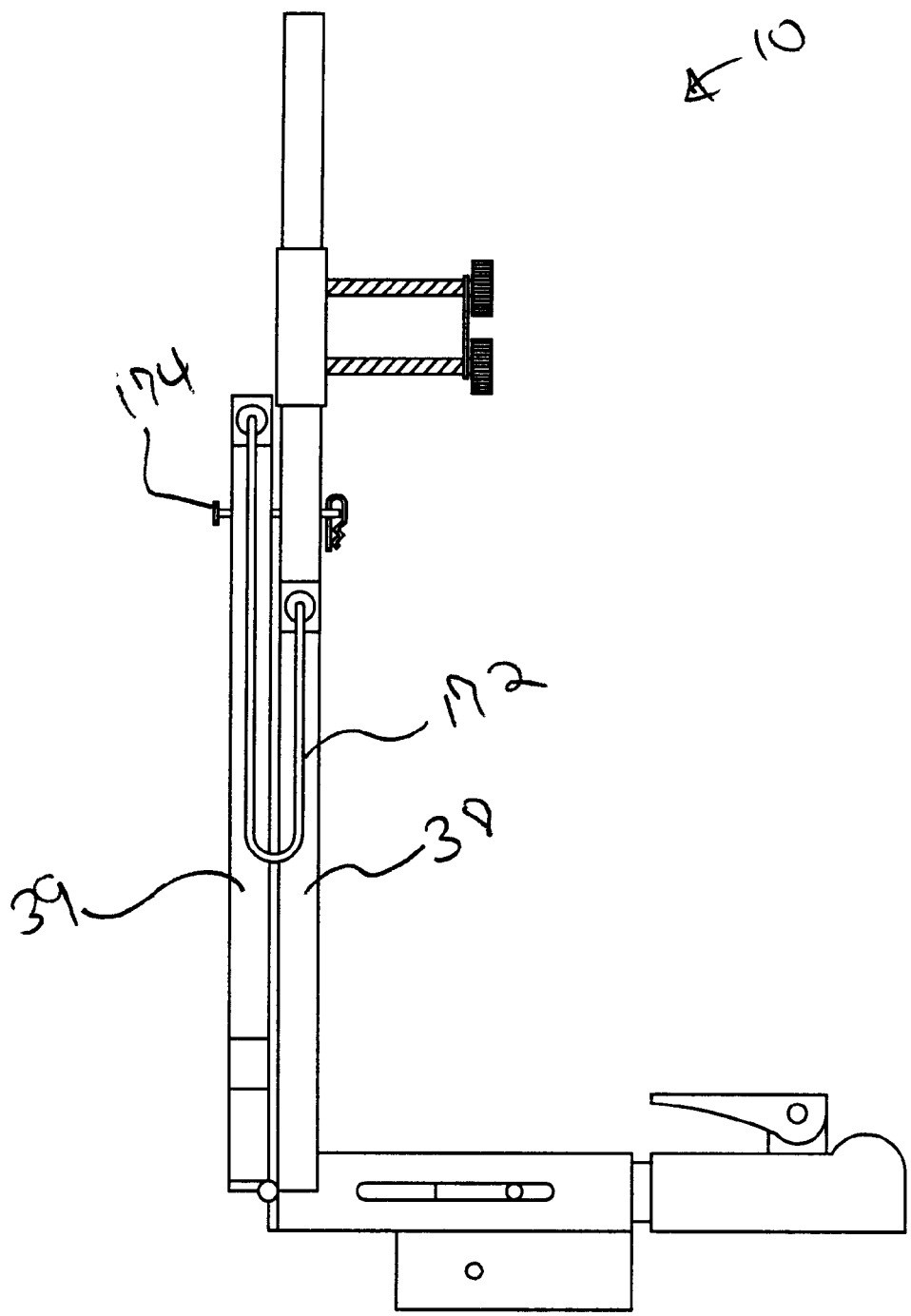
FIG. 30 is a side view of the extension bed apparatus in a compacted position.

FIGS. 1–39 show various parts, portions, and embodiments of the extension bed apparatus 10 and the utilization of multiple extension bed apparatus 10 to create an extension bed carrying system apparatus 100. We will begin with an overview of the system and then provide a detailed description of the construction of the preferred embodiment.

As shown in FIGS. 37–39, by utilizing the extension bed apparatus 10 or multiple extension bed apparatus 10 in an extension bed carrying system apparatus 100, the present invention enables the use of an all-terrain vehicle to carry both a first load 12 and a second load 14 on a vehicle 16. The extension bed apparatus 10 is connected by an attachment block 18 which is known as either a front connecting block 18 or a rear connecting block 18 that is connected to the frame 20 of the vehicle 16. An additional connection is made with either the front frame rack 22 or the rear frame rack 24 to allow for connection of the extension bed apparatus 10. In a standard all-terrain vehicle 16 construction, the body 25 of the vehicle 16 which supports the front frame rack 22 and the rear frame rack 24 is connected through at least one moveable shock absorbing connection (not shown) to allow for shock absorbing capabilities for the all-terrain vehicle 16.

As shown in FIG. 39 a front extension bed apparatus 28 and a rear extension bed apparatus 30 may be built as the disclosed extension bed apparatus 10 and connected to the vehicle 16 for carrying the multiple loads 12, 14. The front extension bed apparatus 28 is connected by the front frame connector 19 and includes a front bed wall 36 with at least one first front movement absorbing connector 40 so that the front frame rack 22 may move in relation to the front connecting block 18 and still support the front extension bed 28. This may be done either at the top or bottom of the extension bed. For the preferred embodiment, this is done at the frame rack connection. The front movement absorbing connector 40 includes a vertical slide 136, also known as connector base 136, which attaches to the front bed wall 36 to allow for movement of the front frame rack 22 in relation to the attachment bar 19, also known as the front frame connector 19. A front bed base 44 extends off of the front bed wall 36 to provide support for the load 12. The rear extension bed 30 is built in a similar manner to include a rear frame connector 34 for attachment to the back connecting block 18. The rear extension bed apparatus 30 also includes a rear bed wall 38 which supports a rear bed base 39 by connecting to the connecting block 18 and also connecting to the rear frame rack 24 through the first rear movement absorbing connector 42. The following detailed description will utilize the reference numbers associated with the rear extension bed apparatus due to the orientation of the drawings, but this is not meant to limit the claims of the present invention.

FIG. 1 of the drawings shows the main wall 38, shown as the rear bed wall 38, for the extension bed apparatus 10. The main wall 38 is constructed utilizing an exterior frame 102 including a top frame member 104, a bottom frame member 106, a left frame member 108, and a right frame member 110 along with a cross frame member 112. The top frame member 104 may also be referred to as a rear cross bar member 104 when used to support a winch 98. Welded to the side frame members 108, 110 are connecting members 114 which allow for the connection of the side rails 116 to the main wall 38. The bottom frame member 106 of the main wall 38 includes mounting locations 118 for hinges 120 and for the frame connector 122 and trailer hitch extension connecting member 124 for attachment to the all-terrain vehicle 16 and for providing a extended trailer hitch 126. The side members 108, 110 act as central support structures for the movement absorbing connectors 42 which slide up and down on the side frame members 108, 110. Holes 128 may be provided on the top frame member 104 to allow for connection of an extending hook 130 so the additional items may be hung off of the main wall 38. A still further improvement may be provided for the extension bed apparatus 10 by providing a winch 98 for lifting loads into the extension bed apparatus 10. Each of the frame members 104, 106, 108, 110, 112 are constructed from steel tubing, and in the preferred embodiment a square steel tubing of approximately 1¼" is utilized. The main wall 38 may then be covered with a steel mesh 132 for supporting the load 14. The mesh 132 is shown in a cut away view to allow an understanding of the frame members 104, 106, 108, 110, 112. The mesh 132 may extend partially, or across the entire surface of the main wall 38 to provide for support of the load 14 with the main wall 38.

FIG. 2 of the drawings shows a side view of the frame 102 with the side member 110 of the frame supporting the connecting member 114. From this view we can see how the moveable shock absorbing connection 42 is formed by taking the connector base 136 and placing it so it slides on top of the side frame member 110 in a vertical manner. The extending bolts 138 should be oriented for connection with the frame rack 24 on the vehicle 16. FIGS. 3 and 4 show the connector plate 146 which is placed on top of the bolts 138 extending from the connector base 136 which is then bolted and clamped to the frame rack 24 on the all-terrain vehicle 16. FIGS. 5 and 6 show the side and front view of the separate part of the connector base 136 showing the extending bolts 138 which are used to connect to the connector plate 146.

At the bottom of FIG. 2 one may see the parts of the frame connector 122 with an extended slot 140 allowing for a bolted connection between the adjustable truing connection 144 and an inserted extension member 142 (shown in FIG. 33) such that a hole 141 through the extension member 142 can be clamped down on with a bolt to provide for the truing connector 122. The basic part for the extension member 144 is shown in FIGS. 18 and 19 of the drawings which show the outer portion of the truing connector to provide side and end view construction details for this element before it is welded onto the frame 102 of the bed wall 38.

FIGS. 1 and 2 of the drawings also the show trailer hitch extension connecting member 124 for providing a extended trailer hitch 126. This is a similar set up to the receiver or frame hitches currently mounted under trucks and sport utility vehicles. FIGS. 20 and 21 provide similar views for the trailer extension connector 124 for welding onto the adjustable truing connector 122 for attachment to the bed wall 38. FIGS. 22 and 23 show the extended hitch connector 146 which may be slide inside the extended trailer hitch extension 124 to provide for a trailer hitch ball 48 extending past the compacted form of the extension bed apparatus 10 (see FIG. 32) for attachment of a trailer while still having the extended bed apparatus 10 attached to the all-terrain vehicle 16.

FIGS. 7, 8 and 9 show the front, side, and end view of the bed base 39 which is constructed from a bed frame 150 which includes a front bed member 152, a rear bed member 154, a left side bed member 156, and a right side bed member 158 as well as a bed cross member 160. As shown in FIGS. 7–9 the bed base 39 also includes connecting members 114 attached to the outside of the frame 150 as well as holes 162 connected through the frame 150 to allow for hitch pins for connection and bolting arrangements. A mesh 165, shown in a cutaway view to show the construction of the frame 150, may also be utilized in a partial or full coverage application. FIG. 7 of the drawings also shows the positioning of hinges 120 on the bed base to allow for the extension and contraction of the bed base 39 in relation to the main wall 38 as well as the connection of a back wall 350 in a tailgate arrangement.

FIGS. 10, 11 and 12 show the top, side and end views of an alterative embodiment of the bed base 39 showing how it may be increased in size as well as showing how a wheel flange 164 may be connected to the base frame 150 for attaching a wheel 166 for ground support on a distal end (from the vehicle 16) of the bed frame 150. FIG. 13 shows a top view of the wheel flange 164 that is attached to the bed frame 150.

FIG. 14 of the drawings shows a side support structure 68 for providing lateral support to a load by showing a side view of the side rail 116 and FIG. 15 shows the side post 170. By using a bed side rail 116, post 170, and/or bed side 168, additional support may be provided to the load 14 and the side rail 116 may also be utilized to support the bed base in the extended position from the bed wall. The side rail 116 is adapted to slide inside the connecting members 114 of the bed base 39 and the bed wall 102 in order to support the bed base 39 off of the bed wall 102. The side post 170 is adapted to connected to the bed base 39 and provide support for the bed side 168. FIGS. 16 and 17 show the bed side 168 which may be utilized to connect to the side rail 116 in order to provide lateral support, side to side support, for the load 14 supported by the bed base 39.

FIGS. 24 and 25 show the general construction of a cable 172 utilized as a flexible side support structure for attaching either the bed base 39 to the bed wall 38 or for attaching the tailgate 170 to the side rail 116.

FIG. 26 shows the typical construction for a connecting pin 174 which may be utilized to hold either the tailgate 170 or the bed base 39 in a compacted position with the other elements and may be utilized to support or connect the various elements together utilizing the connecting members.

FIGS. 27 and 28 show front and side views of the hanger 130 which may be extended from a cross bar member 104 to support additional items off of the extension bed apparatus 10.

FIG. 29 of the drawings shows a side view of an extension bed apparatus 10 utilizing a trailer hitch 50 attached to the truing connector 144 for connection to a hitch ball 48 in the back of an all-terrain vehicle 16. This connection may be seen in FIG. 39. Also shown in FIG. 29 is the use of the movement absorbing connector 42 with the connecting plate 146 with hand tightenable nuts 176 attaching the connecting plate 146 to the connecting base 36. The arrows 178 in FIG. 29 indicate the slideable movement of the movement absorbing connector 42 along the side member 110 of the wall frame 102 to allow for the frame rack 24 shown in FIG. 39 to vertically move in relation to the hitch ball 48 coming off of the frame of the all-terrain vehicle 16. FIG. 29 also shows the utilization of a cable 172 for supporting the bed base 39 off of the main wall 38 with the bed base 39 in an extended position. By comparison with FIG. 30 one can see the use of a connecting pin 174 holding the bed base 39 in a compacted position parallel to the bed wall 38 with the cable 172 forming a simple gravity held loop so that the bed base 39 may be extended from the bed wall 172 at a later time.

Thus, it may be seen that the bed base 39 is connected to the bed wall through a hinge 120 which allows for placement of the bed base 39 in either an extended position for carrying a load or a compacted position for travel. A similar embodiment is then shown in FIGS. 31 and 32 except that instead of using a cable 172 for supporting the bed base 39 a ground supporting member 165 shown as a wheel 166 and wheel flange 164 is attached to the bed base 39. This wheel 166 and flange 164 allows for the bed base 39 to be supported at the back or distal end of the bed base 39. The bed base is also supported off of the ground and off of the all-terrain vehicle 16 at the front. The wheel 166 also provides additional advantages as shown by the arrow 180 in FIG. 39 because it allows for the bed base 39 to vary in its position related to the bed wall 38 by the hinged movement in response to the varying terrain conditions as shown in FIG. 39.

FIGS. 33 and 34 of the drawings show the use of a side rail 116 for supporting the bed base 39 off of the main wall 38 through the use of the connecting members 114. FIG. 34 then shows the compaction of the bed base 39 and the side wall 116 into an over wheel carrying position where the extension of the side rail 116 extends through the connecting member 114 in a position above the rear wheel 17 of the carrying vehicle 16 and beneath the fender 19 of the carrying vehicle 16 where it does not interfere with operation of the all-terrain vehicle 16.

FIGS. 35 and 36 of the drawings show the positioning of a back side 350, also known as a tailgate 350, hingeably mounted off of the extension bed apparatus 10. In this particular embodiment an adjustable cable 172 is utilized to support the tailgate 350 in a compacted arrangement which may be extended to support the tailgate 350 in an extended arrangement. This back side 350 may be attached to the extension bed apparatus 10 in order to provide longitudinal support for the load. The back side 350 may be constructed utilizing a hinge 120 to form a tailgate 350 to allow for opening and closing of the back side 350 in relation to the side rail 116.

Also shown in FIG. 35 is the utilization of a bed liner 90 for supporting a particle load 91 shown as gravel extending out of the top of the bed liner 90. The bed liner 90 is preferably formed from a flexible material such as a 6 mil plastic which may be snapped or other wise removably connected onto the extension bed apparatus by a removable connection 93 that allows removable and compaction of the bed liner 90 for storage and transportation purposes. It is also envisioned that a rigid material may be utilized for the bed liner 90.

As shown in the FIGS. 29–39 the extension bed apparatus 10 may include a trailer hitch 50 which is adapted to connect to a hitch ball 48 that is connected to the attachment block 18 of the all-terrain vehicle 16. In order to provide for different amounts of extensions for different hitch balls 48, a trailer hitch adjustable truing connector 52 may be connected to allow for movement of the bed wall 38 in relation to the hitch ball 48. Thus, the adjustable truing connector 52 allows for adjustment of a relative distance between the bed wall 38 and the trailer hitch 54.

FIGS. 37, 38 and 39 of the drawings show the utilization of both a front extension bed 28 and a rear extension bed 30 for forming an extension bed carrying system apparatus 100. As shown in the movement of the vehicle frame rack 24 in FIGS. 37 and 38, movement of the rear frame rack 24 in relation to the attachment block 18 provides for a difficulty in attaching the bed wall 38 to the all-terrain vehicle. In this embodiment it is shown how the movement of the rear movement absorbing connector allows for movement of the rear frame rack 38 in relation to the attachment block 18 while still providing support for the extension bed apparatus 10. The front extension bed 28 may operate in the same manner to allow for movement of the front frame rack 22 in relation to the attachment block 18 on the front of the all-terrain vehicle 16.

FIG. 39 of the drawing then shows the ability of the hinged beds 39 of the extension bed apparatus 10 to adapt and compensate for varying terrain characteristics which may be encountered by the all-terrain vehicle 16.

The preferred embodiments described herein have shown the use of a fixed attachment to the frame and a moveable connection to the frame rack. An alternative design is to fix the attachment to the frame rack and use the sidable connection on the vehicle frame connection.

Thus, although there have been described particular embodiments of the present invention of a new and useful Hitch Carrying Rack for All Terrain Vehicles, it is not intended that such references be construed as limitations upon the scope of this invention except as set forth in the following claims.

What is claimed is:

1. An extension bed apparatus for carrying a load with a vehicle, the vehicle including an attachment block connected to a frame and a frame rack connected to the frame through a moveable shock absorbing connection, the extension bed comprising:
   a frame connector adapted to connect to the attachment block;
   a bed wall connected to and extending upward from the frame connector;
   a first movement absorbing connector attaching the bed wall to the frame rack, the movement absorbing connector adapted to allow movement of the frame rack relative to the attachment block; and
   a bed base connected to the bed wall and adapted to extend laterally away from the vehicle to support the load.

2. The apparatus of claim 1, the frame including a hitch ball extending from the frame and the frame connector comprising:
   a trailer hitch adapted for removable connection to the hitch ball.

3. The apparatus of claim 2, the frame connector further comprising:
   an adjustable truing connector adapted to allow an adjustment of a relative distance between the bed wall and the trailer hitch for proper positioning of the bed wall in relation to the frame rack.

4. The apparatus of claim 2, the bed wall comprising:
   a cross bar member; and
   at least one hanger extending from the cross bar member.

5. The apparatus of claim 1, the first movement absorbing connector comprising:
   a vertical slide moveably connected to the bed wall and adapted to connect and support the bed wall off of the frame rack while allowing vertical movement of the frame rack in relation to the bed wall.

6. The apparatus of claim 1, further comprising:
   a hinge connected between the bed base and the bed wall and adapted to allow the bed base to be placed into both an extended position and a compacted position.

7. The apparatus of claim 1, further comprising:
   a side support structure adapted to support the bad base off of the bed wall.

8. The apparatus of claim 7, the side support structure comprising:
   a cable extending from the bed wall to the bed base, wherein the cable is adapted to support the base in an extended position from the bed wall.

9. The apparatus of claim 7, the side support structure comprising:
   a side rail extending from the bed wall to the bed base, wherein the side rail is adapted to support the base in an extended position from the bed wall.

10. The apparatus of claim 1, further comprising:
    a bed side connected to and extending upward from the bed base, wherein the bed side is adapted to provide lateral support to the load.

11. The apparatus of claim 1, further comprising:
    a back side connected to and extending upward from the bed base, wherein the back side is adapted to provide longitudinal support to the load.

12. The apparatus of claim 11, further comprising:
    a hinge connecting the back side and the bed base, wherein the hinge is adapted to allow the bed base to be placed into both an extended position and a compacted position.

13. The apparatus of claim 12, further comprising:
    a side rail extending from the bed wall to the bed base and adapted to support the bed base in an extended position from the bed wall; and
    a tail gate support structure adapted to support the back side off of the side rail.

14. The apparatus of claim 1, further comprising:
    at least one wheel connected to the bed base and adapted to provide ground support to an end of the bed base distal from the frame connector.

15. The apparatus of claim 1, further comprising:
    a bed liner adapted to be removably secured to the extension bed, the bed liner adapted to provide support to a particle load.

16. The apparatus of claim 15, wherein the bed liner is constructed from a flexible material allowing for compaction of the bed liner.

17. The apparatus of claim 1, the rear bed wall comprising:
- a rear cross bar member; and
- a winch connected to the rear cross bar member.

18. An extension bed carrying system apparatus for carrying a first load and a second load with a vehicle, the vehicle including a frame with both a rear frame rack and a front frame rack connected to the frame through at least one moveable shock absorbing connection, the frame further including a front connecting block and a back connecting block, the extension bed carrying system comprising:
- a front extension bed including a front frame connector adapted to connect to the front connecting block, a front bed wall connected to and extending upward from the front frame connector, a first front movement absorbing connector attaching the front bed wall to the front frame rack, the front movement absorbing connector adapted to allow movement of the front frame rack relative to the front connecting block, a front bed base connected to the front bed wall and adapted to extend laterally away from the vehicle to support the first load; and
- a rear extension bed including a rear frame connector adapted to connect to the rear connecting block, a rear bed wall connected to and extending upward from the rear frame connector, a first rear movement absorbing connector attaching the rear bed wall to the rear frame rack, the rear movement absorbing connector adapted to allow movement of the rear frame rack relative to the rear connecting block, a rear bed base connected to the rear bed wall and adapted to extend laterally away from the vehicle to support the second load.

19. The apparatus of claim 18, further comprising:
- at least one wheel connected to the rear bed base and adapted to provide ground support to an end of the rear bed base distal from the rear frame connector.

20. The apparatus of claim 18, the rear bed wall comprising:
- a rear cross bar member; and
- a winch connected to the rear cross bar member.

21. An extension bed apparatus for carrying a load with a vehicle, the vehicle including an attachment block connected to a frame and a frame rack connected to the frame through a moveable shock absorbing connection, the extension bed comprising:
- a fixed connector adapted to connect to one side of the moveable shock absorbing connection;
- a bed wall connected to the fixed connector;
- a first movement absorbing connector attaching the bed wall to the opposite side of the moveable shock absorbing connection, the movement absorbing connector adapted to allow movement of the moveable shock absorbing connection; and
- a bed base connected to the bed wall and adapted to extend laterally away from the vehicle to support the load.

* * * * *